Aug. 22, 1939.   J. E. BAUER   2,170,602
METHOD OF PRODUCING GLASS BUILDING BLOCKS
Filed June 29, 1937
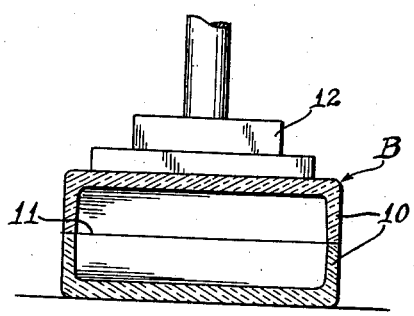
FIG-1-
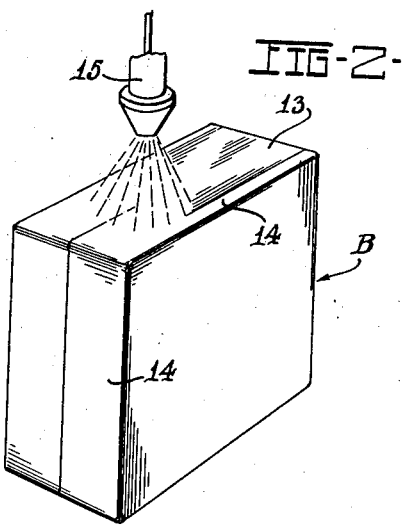
FIG-2-
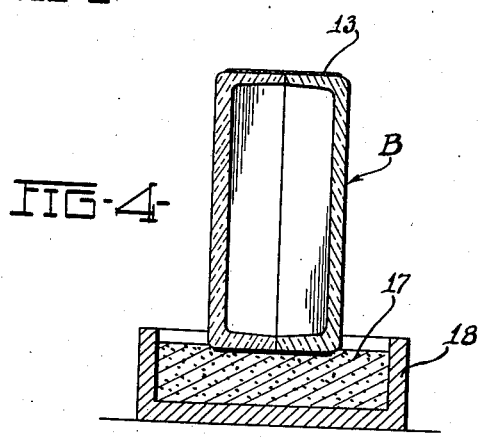
FIG-4-
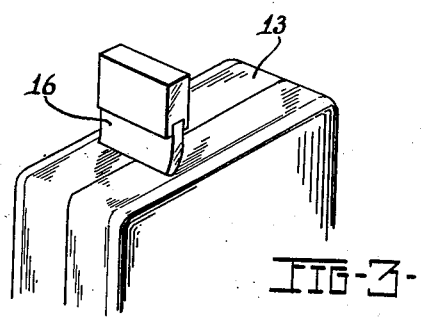
FIG-3-
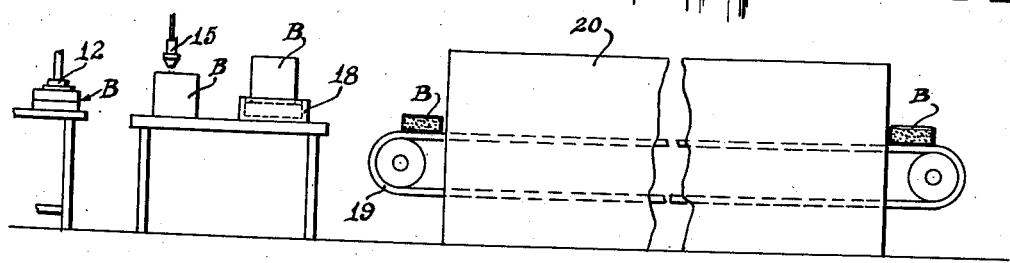
FIG-6-
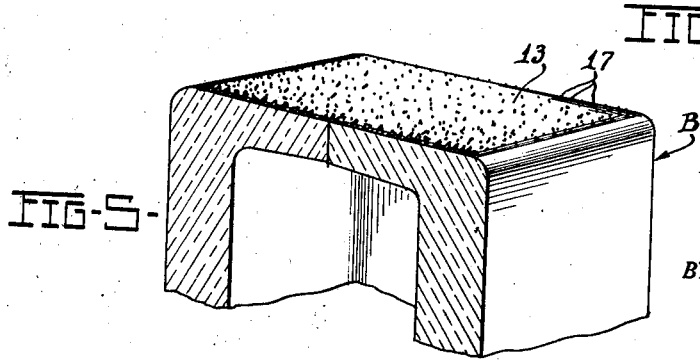
FIG-5-
J. E. Bauer,
INVENTOR.
BY Rule, Hoge
ATTORNEYS.

Patented Aug. 22, 1939

2,170,602

UNITED STATES PATENT OFFICE 2,170,602

METHOD OF PRODUCING GLASS BUILDING BLOCKS

John E. Bauer, Muncie, Ind., assignor to Owens-Illinois Glass Company, a corporation of Ohio Application June 29, 1937, Serial No. 150,954

1 Claim. (Cl. 49—81)

The present invention relates to improvements in the method of producing glass building blocks and more particularly to the treatment of the mortar-bearing surfaces of a hollow block in a fashion to increase the effectiveness of the bond between such surfaces and a mortar or other medium employed in uniting the blocks in a wall structure and prevent relative lateral movement of the blocks during setting of the mortar.

Another object is the provision of a novel method of applying a film or coating to the mortar-bearing surfaces which will result in a material increase in the tensile, shearing and other mechanical strength of a wall structure.

Other objects will be in part apparent and in part pointed out hereinafter.

In the drawing:

Fig. 1 is a sectional elevational view showing two cup-like sections being united under pressure;

Fig. 2 is a perspective view illustrating one method of applying a film of metal to the mortar-bearing surfaces of the block;

Fig. 3 is a view similar to Fig. 2 showing another method of applying a film of metal to the mortar-bearing surfaces of the block;

Fig. 4 is a detail sectional view illustrating the manner in which the metallized mortar-bearing surfaces are sanded or coated with a gritty material prior to setting of the metal and the final annealing operation;

Fig. 5 is a fragmentary perspective view illustrating in detail the complete rough surfaced film or coating which is applied to the mortar-bearing surfaces of the block; and Fig. 6 is an elevational view illustrating more or less diagrammatically the steps involved in the production of a sectional hollow glass building block, the mortar-bearing surfaces of which are coated with a gritty material.

In accordance with the present invention, the glass building block B is made up of two cup-like sections 10 which have their edges 11 bonded together in any preferred manner. In some instances a glass-to-glass bond is effected while in others, these edges are metallized and then united. Ordinarily a presser head 12 or its equivalent is employed in the application of pressure to the assembled block sections during setting of the glass or metallic bonding medium. Immediately upon completion of the assembly operation and prior to any great loss of the heat present in the glass during the molding operation, a coating 13 or film of metal such for example as aluminum, aluminum alloy, or any other metal having an affinity for glass, is applied to the mortar-bearing surfaces 14 in any preferred manner. In Fig. 2 I have shown a spray gun head 15, while in Fig. 3 a wiper 16 is employed to uniformly spread and smooth the metal which may be poured or otherwise initially placed upon these surfaces. Before the metal has completely set or solidified, the coated surfaces are dipped into a gritty material 17, sand for example which is contained in a tray 18 or like receptacle. Thus a certain amount of the gritty material becomes embedded in and securely bonded to the film of aluminum with the result that the final mortar-bearing surfaces are quite rough and particularly well adapted for adhesion to the mortar or other like material employed in uniting the blocks in a wall structure.

Immediately following the sanding operation, the blocks are placed upon a leer conveyor 19 by which they are carried through an annealing leer, the function of which is entirely obvious.

Modifications may be resorted to within the spirit and scope of the appended claim.

I claim:

The method which consists in producing a hollow glass building block having mortar-bearing surfaces and prior to any great loss of the heat present in the glass during production of the block, applying to said surfaces in a molten state a substantially uniform film of metal having an affinity for the glass, dispersing a gritty material over the film of metal while the latter is still more or less plastic and capable of adhesion to said material, and annealing the block.

JOHN E. BAUER.